(12) United States Patent
Rosén (10) Patent No.: US 11,226,108 B2
(45) Date of Patent: Jan. 18, 2022

(54) HEAT TRANSFER SYSTEM

(71) Applicant: E.ON Sverige AB, Malmö (SE)

(72) Inventor: Per Rosén, Lund (SE)

(73) Assignee: E.ON SVERIGE AB, Malmö (SE)

( * ) Notice: Subject to any disclaimer, the term of this patent is extended or adjusted under 35 U.S.C. 154(b) by 127 days.

(21) Appl. No.: 16/314,446

(22) PCT Filed: Jun. 29, 2017

(86) PCT No.: PCT/EP2017/066124
§ 371 (c)(1),
(2) Date: Dec. 31, 2018

(87) PCT Pub. No.: WO2018/015123
PCT Pub. Date: Jan. 25, 2018

(65) Prior Publication Data
US 2019/0154272 A1    May 23, 2019

(30) Foreign Application Priority Data

Jul. 19, 2016  (EP) .................................. 16180069

(51) Int. Cl.
*F24D 10/00* (2006.01)
*F25B 25/00* (2006.01)
*F25B 29/00* (2006.01)

(52) U.S. Cl.
CPC ........... *F24D 10/003* (2013.01); *F24D 10/00* (2013.01); *F25B 25/005* (2013.01);
(Continued)

(58) Field of Classification Search
CPC .......... F24D 3/18; F24D 10/006; F24D 10/00; F24D 19/1048; F24D 10/003;
(Continued)

(56) References Cited

U.S. PATENT DOCUMENTS

2016/0334116 A1* 11/2016 Zaynulin ............... F24D 10/006

FOREIGN PATENT DOCUMENTS

| DE | 20 2012 103891 U1 | 12/2012 |
|---|---|---|
| DE | 10 2013 209680 A1 | 11/2014 |

(Continued)

OTHER PUBLICATIONS

JPH0445332A Translation (Year: 1992).*
(Continued)

*Primary Examiner* — Marc E Norman
*Assistant Examiner* — Schyler S Sanks
(74) *Attorney, Agent, or Firm* — Xsensus LLP (57) ABSTRACT

The present invention relates to a heat transfer system comprising a heating circuit having a feed conduit for an incoming flow of heat transfer fluid having a first temperature, and a return conduit for a return flow of heat transfer fluid having a second temperature, the second temperature being lower than the first temperature. The heat transfer system also includes a cooling circuit having a feed conduit for an incoming flow of heat transfer fluid having a third temperature, and a return conduit for a return flow of heat transfer fluid having a fourth temperature, the fourth temperature being higher than the third temperature, and a heat pump including a first heat exchanger having a first circuit for circulating heat transfer fluid and a second circuit for circulating heat transfer fluid.

10 Claims, 4 Drawing Sheets

(52) U.S. Cl.
CPC ........ *F25B 29/003* (2013.01); *F24D 2200/12* (2013.01); *F24D 2200/13* (2013.01); *F25B 2339/047* (2013.01); *Y02B 30/17* (2018.05); *Y02E 20/14* (2013.01)

(58) Field of Classification Search
CPC ........ F24F 5/0003; F24F 3/08; F24F 2203/02; F24F 12/003; F24F 11/47
See application file for complete search history.

(56) References Cited

FOREIGN PATENT DOCUMENTS

| | | | |
|---|---|---|---|
| JP | H0445332 A | * | 6/1992 |
| JP | 2008-256272 A | | 10/2008 |
| WO | 2008/102292 A2 | | 8/2008 |
| WO | 2010/145040 A1 | | 12/2010 |
| WO | 2015/068899 A1 | | 5/2015 |
| WO | WO-2015068899 A1 | * | 5/2015 ........... F24D 10/003 |

OTHER PUBLICATIONS

International Search Report dated Sep. 28, 2017 for PCT/EP2017/066124 filed on Jun. 29, 2017, 10 pages.
English translation of Korean Preliminary Rejection issued in Korean Application No. 10-2018-7037494.

* cited by examiner

HEAT TRANSFER SYSTEM

CROSS-REFERENCE TO RELATED APPLICATIONS

This application is a National Stage Application based on PCT/EP2017/066124, filed on 29 Jun. 2017, and claims priority to European Patent Application No. 16180069.3, filed on 17 Jul. 2016, the entire contents of which being incorporated herein by reference.

TECHNICAL FIELD

The present invention relates to a heat transfer system.

BACKGROUND

Nearly all large developed cities in the world have at least two types of energy distribution grids incorporated in their infrastructures: one grid for providing heating and one grid for providing cooling. The grid for providing heating may e.g. be used for providing comfort and/or process heating, and/or hot tap water preparation. The grid for providing cooling may e.g. be used for providing comfort and/or process cooling.

A common grid for providing heating is a gas grid providing a burnable gas, typically a fossil fuel gas. The gas provided by the gas grid is locally burned at a building for providing comfort and/or process heating, and/or hot tap water preparation. An alternative grid for providing heating is a district heating grid. The district heating grid is used for providing heated heat transfer liquid, typically in the form of water, to buildings of the city. A centrally placed heating and pumping plant is used for heating and distributing the heat transfer liquid. The heat transfer liquid is delivered to buildings of the city via one or more feed conduits and is returned to the heating and pumping plant via one or more return conduits. Locally at a building heat from the heat transfer liquid is extracted via a heat exchanger. Further alternative, electrical energy of an electrical energy grid may be used for heating. The electrical energy may e.g. be used for heating tap water or for heating local heat transfer liquid used for comfort and/or process heating.

A common grid for providing cooling is the electrical energy grid. The electrical energy may e.g. be used for running refrigerators or freezers. The electrical energy may e.g. be used for running air conditioners for providing comfort cooling. An alternative grid for providing cooling is a district cooling grid. The district cooling grid is used for providing chilled heat transfer liquid, typically in the form of water, to buildings of the city. A centrally placed cooling and pumping plant is used for cooling and distributing the heat transfer liquid. The heat transfer liquid is delivered to buildings of the city via one or more feed conduits and is returned to the cooling and pumping plant via one or more return conduits. Locally at a building cold from the heat transfer liquid is extracted via a heat exchanger.

The use of energy for heating and/or cooling is steadily increasing influencing the environment negatively. By improving utilization of the energy distributed in the energy distribution grids, negative influences on the environment may be reduced. Hence, there is a need for improving utilization of the energy distributed in energy distribution grids.

SUMMARY OF THE INVENTION

It is an object of the present invention to solve at least some of the problems mentioned above.

According to a first aspect a heat transfer system is provided. The heat transfer system comprises a heating circuit having: a feed conduit for an incoming flow of heat transfer fluid having a first temperature, and a return conduit for a return flow of heat transfer fluid having a second temperature, the second temperature being lower than the first temperature; a cooling circuit having: a feed conduit for an incoming flow of heat transfer fluid having a third temperature, and a return conduit for a return flow of heat transfer fluid having a fourth temperature, the fourth temperature being higher than the third temperature; and a heat pump having: a first heat exchanger having a first circuit for circulating heat transfer fluid and a second circuit for circulating heat transfer fluid, wherein the first circuit has an inlet and an outlet connected to the cooling circuit, a second heat exchanger having a third circuit for circulating heat transfer fluid and a fourth circuit for circulating heat transfer fluid, wherein the fourth circuit has an inlet and an outlet connected to the heating circuit, wherein the second circuit and the third circuit is a common circuit of the first and second heat exchangers; wherein the fourth temperature is lower than the second temperature.

In the context of the present disclosure the wording "heat transfer fluid" shall be construed as a fluid having the ability to transfer thermal energy. The heat transfer fluid may carry thermal energy from one place to another. The heat transfer fluid may comprise water. However, according to other embodiments other heat transfer fluids may be used. Some non-limiting examples are ammonia, anti-freezing liquids (such as glycol), oils and alcohols. The heat transfer fluid may also comprise a mixture of two or more of the heat transfer fluids mentioned above.

This allow for heat absorbed by the heat transfer fluid in the cooling circuit, which absorbed heat normally is carried away from the building via e.g. a district cooling grid or normally is emitted to the environment using e.g. cooling columns, to be re-used for heating the heat transfer fluid of the heating circuit. Hence, the need for extracting heat from the building at the cooling circuit is lowered at the same time as the need for providing the building with a heat through the district heating grid or the gas grid is lowered. Hence, an improved utilization of the energy distributed in energy distribution grids is provided.

The inlet of the first circuit may be connected to the return conduit of the cooling circuit.

The inlet of the fourth circuit may be connected to the return conduit of the heating circuit.

The outlet of the first circuit may be connected to the return conduit of the cooling circuit. By connecting the outlet of the first circuit to the return conduit of the cooling circuit the installation of the heat pump causes a minimum of interference on and adaptation of a control system of the heat pump.

The inlet of the first circuit may be connected to the return conduit of the cooling circuit upstream relative to the outlet of the first circuit.

The outlet of the fourth circuit may be connected to the return conduit of the heating circuit. By connecting the outlet of the fourth circuit to the return conduit of the heating circuit the installation of the heat pump causes a minimum of interference on and adaptation of the control system of the heat pump.

The inlet of the fourth circuit may be connected to the return conduit of the heating circuit upstream relative to the outlet of the fourth circuit.

The outlet of the first circuit may be connected to the feed conduit of the cooling circuit. By connecting the outlet of the first circuit to the feed conduit of the cooling circuit the installation of the heat pump causes a minimum of interference on and adaptation of a control system of the local cooling system.

The outlet of the fourth circuit may be connected to the feed conduit of the heating circuit. By connecting the outlet of the fourth circuit to the feed conduit of the heating circuit the installation of the heat pump causes a minimum of interference on and adaptation of a control system of the local heating system.

The common circuit may comprise a compressor.

The common circuit may comprise an expansion valve.

The first heat exchanger may be an evaporator heat exchanger.

The second heat exchanger may be a condenser heat exchanger.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended drawings showing embodiments of the invention. The figures should not be considered limiting the invention to the specific embodiment; instead they are used for explaining and understanding the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
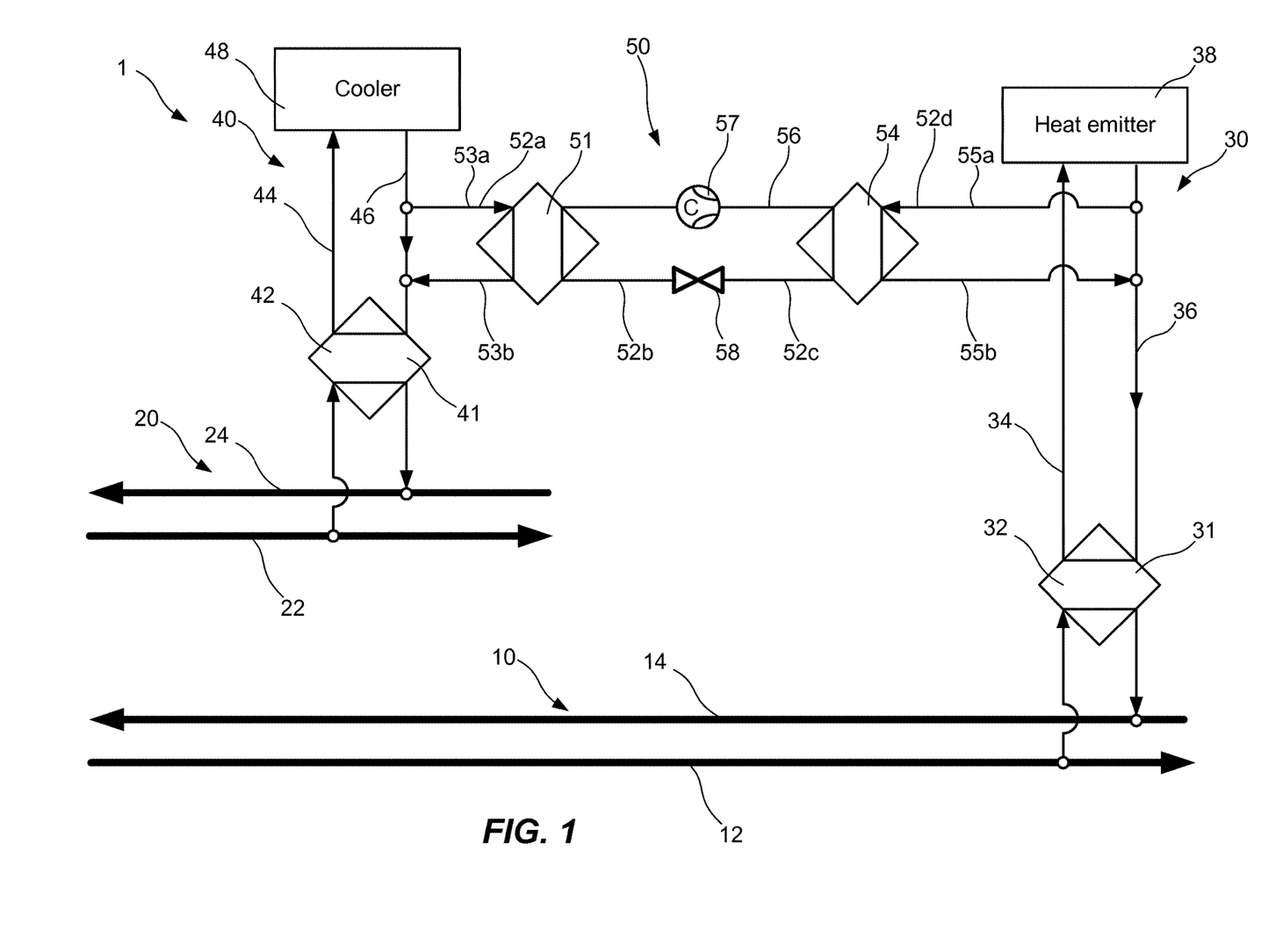
FIG. 1 is a schematic diagram of a heat transfer system according to one embodiment.
Figure 2:
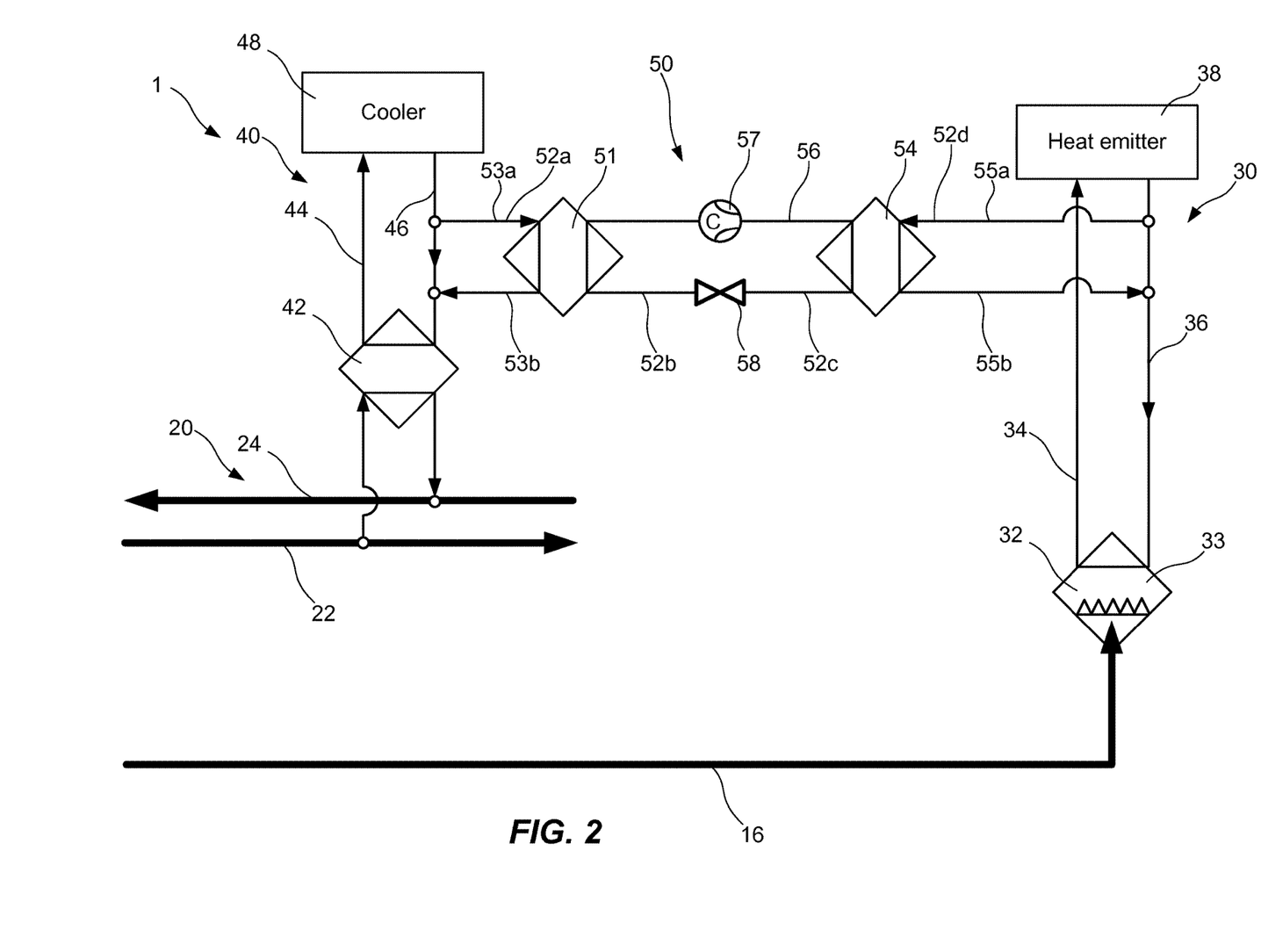
FIG. 2 is a schematic diagram of a heat transfer system according to an alternative embodiment.
Figure 3:
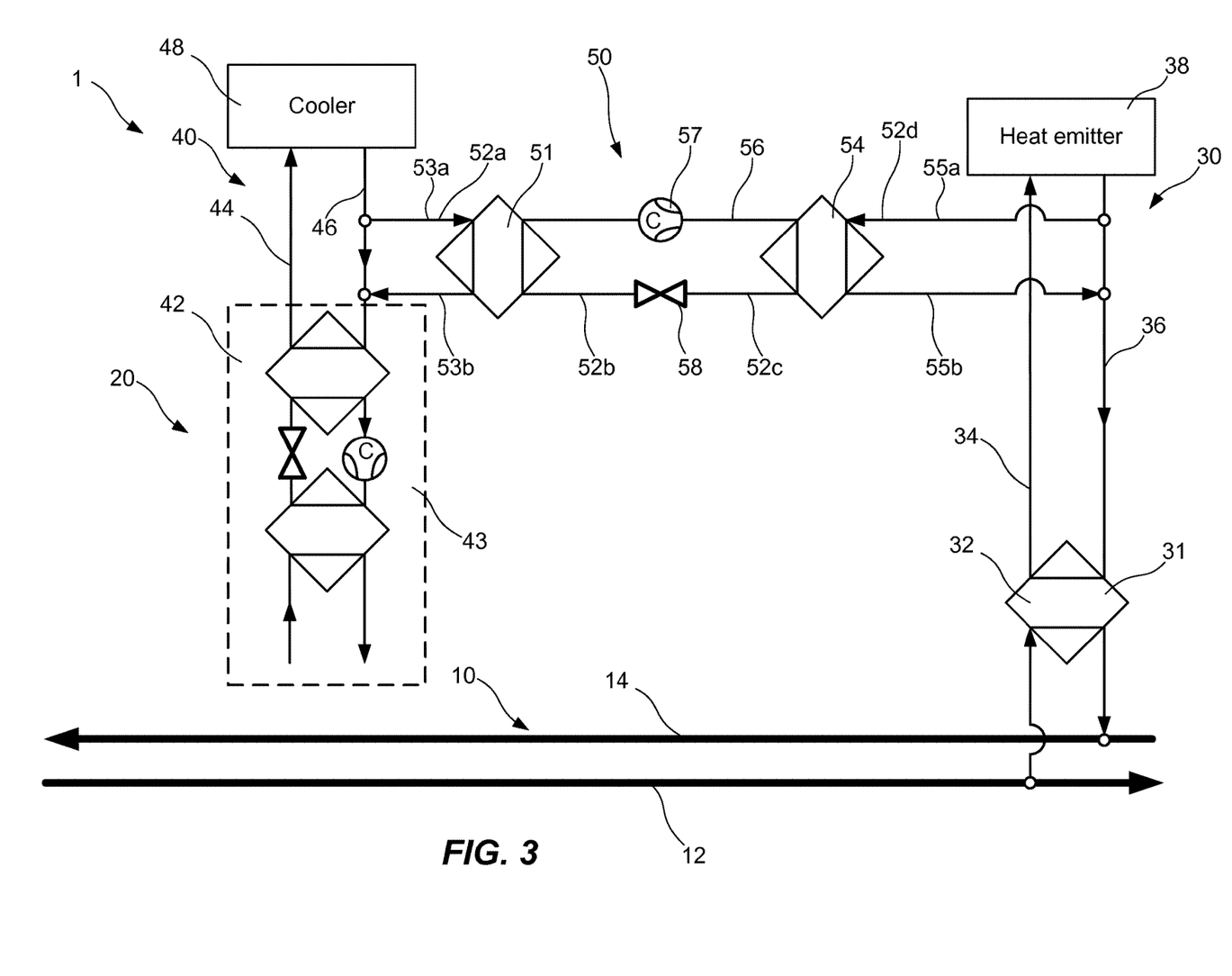
FIG. 3 is a schematic diagram of a heat transfer system according to yet an alternative embodiment.

FIG. 1 illustrates a heat transfer system 1. The heat transfer system 1 comprises a heating circuit 30, a cooling circuit 40 and heat pump 50. The heat transfer system is typically installed in a building (not shown). In FIGS. 2 and 3 alternative embodiments of the heat transfer system 1 are illustrated. The difference between the different embodiments is directed towards how heat is transported to and from the heat transfer systems 1. This will be discussed in more detail below.

The heating circuit 30 comprises a feed conduit 34 and a return conduit 36. The feed conduit 34 is configured to carry heat transfer fluid from a heat source 32 to a heat emitter 38. The heat source 32 is configured to heat the heat transfer fluid. Hence, the feed conduit 34 is configured to carry heated heat transfer fluid from the heat source 32 to the heat emitter 38. The return conduit 36 is configured to carry heat transfer fluid from the heat emitter 38 to the heat source 32. The heat emitter 38 consumes heat from the heat transfer fluid for heating its surroundings. Hence, the heat transfer fluid is cooled at the heat emitter 38. Thus, the return conduit 36 is configured to carry cooled heat transfer fluid from the heat emitter 38 to the heat source 32. In other words, the feed conduit 34 is configured to carry a, to the heat emitter 38, incoming flow of heat transfer fluid having a first temperature and the return conduit 36 is configured to carry a, from the heat emitter 38, return flow of heat transfer fluid having a second temperature, wherein the second temperature is lower than the first temperature.

According to a non-limiting example, in case of the heat transfer fluid comprises mainly water the first temperature is in the range of 25-70° C. and the second temperature is in the range of 0-50° C. As mentioned the heat transfer fluid may be water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto.

As mentioned above the heat source 32 is configured to heat the heat transfer fluid of the heating circuit 30. The heat source 32 may be embodied in different ways. According to the heat transfer systems 1 of FIGS. 1 and 3 the heat source 32 may be a heat exchanger 31 configured to transfer heat from a district heating grid 10 to the heating circuit 30. This may be done by letting heat transfer fluid of the district heating grid 10 to flow from a district heating grid feed conduit 12 to the heat exchanger 31 where the heat transfer fluid of the heating circuit 30 is heated and as a result the heat transfer fluid of the district heating grid 10 is cooled. The cooled heat transfer liquid of the district heating grid 10 may thereafter be returned to a district heating grid return conduit 14. Typically, the heat transfer fluid of the district heating grid 10 is water. However, other fluids or mixtures of fluids may as well be used. Some non-limiting examples are ammonia, anti-freezing liquids (such as glycol), oils and alcohols. A non-limiting example of a mixture is water with an anti-freezing agent, such as glycol, added thereto In the case of the heat transfer fluid of the district heating grid 10 mainly comprising water, the heat transfer fluid flowing to the heat exchanger 31 has a temperature in the range of 60-95° C. In this case, the heat exchanger 31 is typically set such that the heat transfer fluid returned to the district heating return conduit 14 has a temperature in the range of 20-50° C.

Alternatively or in combination, the heat source 32 may be embodied as a burner 33 burning a burnable gas, typically a fossil fuel gas. This is illustrated in connection with FIG. 2. By burning the burnable gas the heat transfer fluid of the heating system 30 is heated at the heat source 32. The burnable gas is typically feed to the burner 33 via a gas grid 16.

As mentioned above the heat emitter 38 is configured to consume heat from the heat transfer fluid for heating its surroundings. Non-limiting examples of processes where heat is consumed are at hot tap water preparation, comfort heating and/or process heating.

The cooling circuit 40 comprises a feed conduit 44 and a return conduit 46. The return conduit 46 is configured to carry heat transfer fluid from a cooler 48 to a heat extractor 42. The cooler 48 is configured to absorb heat from its surroundings in order to cool the surroundings. At the cooler 48 the absorbed heat is transferred to the heat transfer fluid of the cooling circuit 40. Hence, the return conduit 46 is configured to carry heated heat transfer fluid from the cooler 48 to the heat extractor 42. The heat extractor 42 extracts heat from the heat transfer fluid for cooling the heat transfer fluid. Hence, the heat transfer fluid is cooled by the heat extractor 42. The feed conduit 44 is configured to carry heat transfer fluid from the heat extractor 42 to the cooler 48. Thus, the feed conduit 44 is configured to carry cooled heat transfer fluid from the heat extractor 42 to the cooler 48. In other words, the feed conduit 44 is configured to carry a, to the cooler 48, incoming flow of heat transfer fluid having a third temperature and the return conduit 46 is configured to carry a, from the cooler 48, return flow of heat transfer fluid having a fourth temperature, wherein the fourth temperature is higher than the third temperature. According to a non-limiting example, in case of the heat transfer fluid comprises mainly water the third temperature is in the range of 5–10° C. and the fourth temperature is in the range of 10-15° C. As mentioned the heat transfer fluid may be water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto.

As mentioned above the heat extractor 42 is configured to extract heat from the heat transfer fluid of the cooling circuit 40. The heat extractor 42 may be embodied in different ways. According to the heat transfer systems 1 of FIGS. 1 and 2 the heat extractor 42 may be a heat exchanger 41 configured to transfer heat from the cooling circuit 30 to a district cooling grid 20. This may be done by letting heat transfer fluid of a district cooling grid 20 to flow from a district cooling grid feed conduit 22 to the heat exchanger 41 where the heat transfer fluid of the cooling circuit 40 is cooled and as a result the heat transfer fluid of the district cooling grid 20 is heated. The heated heat transfer fluid of the district cooling grid 20 may thereafter be returned to a district cooling grid return conduit 24. Typically, the heat transfer fluid of the district cooling grid 20 is water. However, other fluids or mixtures of fluids may as well be used. Some non-limiting examples are ammonia, anti-freezing liquids (such as glycol), oils and alcohols. A non-limiting example of a mixture is water with an anti-freezing agent, such as glycol, added thereto. In the case of the heat transfer fluid of the district cooling grid 20 mainly comprising water, the heat transfer fluid flowing to the heat exchanger 41 has a temperature in the range of 4-10° C. In this case, the heat exchanger 41 is typically set such that the heat transfer fluid returned to the district cooling return conduit 24 has a temperature in the range of 8–12° C.

Alternatively or in combination, the heat extractor 42 may be embodied as a heat pump 43. The heat pump 42 may be part of a local cooling machine, such as an air conditioner, a freezer, a refrigerator or the like. This is illustrated in connection with FIG. 3.

As mentioned above, the cooler 48 is configured to cool down its surroundings by absorbing heat by the heat transfer liquid. Non-limiting examples of processes where heat is absorbed are at comfort cooling, process cooling, refrigerating and/or freezing.

The heat pump 50 is connected between the cooling circuit 40 and the heating circuit 30. The heat pump 50 is configured to transfer heat from the cooling circuit 40 to the heating circuit 30. This allow for heat absorbed by the heat transfer fluid in the cooling circuit 40, which absorbed heat normally is carried away from the building via the district cooling grid return conduit 24 or normally is emitted to the environment using e.g. cooling columns, to be re-used for heating the heat transfer fluid of the heating circuit 30. Hence, the need for extracting heat from the building at the cooling circuit is lowered at the same time as the need for providing the building with a heat through the district heating grid or the gas grid is lowered. The basic principle of the heat transfer system 1 is thus that heat absorbed at the cooling circuit 40 is re-used at the heating circuit. The heat pump 50 is used for updating the heat absorbed in the cooling circuit 40 to a useful temperature level that may be used in the heating circuit 30.

The heat pump 50 comprises a first heat exchanger 51 and a second heat exchanger 54. The first heat exchanger 51 may be an evaporator heat exchanger. The second heat exchanger 54 may be a condenser heat exchanger. The first heat exchanger 51 comprises a first circuit 52a for circulating heat transfer fluid. The first heat exchanger 51 comprises a second circuit 52b for circulating heat transfer fluid. The first and second circuits 52a, 52b are not in fluid contact with each other. The first circuit 52a has an inlet 53a and an outlet 53b. The inlet 53a of the first circuit 52a is connected to the return conduit 46 of the cooling circuit 40. During operation of the heat pump 50 the first heat transfer exchanger 51 is configured to absorb heat from the heat transfer fluid entering the same via the inlet 53a of the first circuit 52a. The heat transfer fluid returned to the cooling circuit 40 via the outlet 53b will thus be cooled. In the in FIGS. 1-3 shown embodiments the outlet 53b of the first circuit 52a is connected to the return conduit 46 of the cooling circuit 40.

In the case of the inlet 53a and the outlet 53b of the first circuit 52a both being connected to the return conduit 46 of the cooling circuit 40, the inlet 53a of the first circuit 52a is preferably connected to the return conduit 46 of the cooling circuit 40 upstream relative to the outlet 53b of the first circuit 52a.

Moreover, in the case the heat pump 50 is in operation and the inlet 53a and the outlet 53b of the first circuit 52a both being connected to the return conduit 46 of the cooling circuit 40, the heat transfer fluid of the return conduit 46 will be cooled.

Alternatively or in combination to the above configuration of the outlet 53b of the first circuit 52a, the outlet 53b of the first circuit 52a may be connected to the feed conduit 44 of the cooling circuit 40. The connection of the outlet 53b of the first circuit 52a to the feed conduit 44 of the cooling circuit 40 will be discussed in more detail below in connection with FIG. 4.

According to the above, the first circuit 52a and the cooling circuit 40 are in fluid contact with each other.

The second heat exchanger 54 comprises a third circuit 52c for circulating heat transfer fluid. The second heat exchanger 54 comprises a fourth circuit 52d for circulating heat transfer fluid. The third and fourth circuits 52c, 52d are not in fluid contact with each other. The fourth circuit 52d has an inlet 55a and an outlet 55b. The inlet 55a of the fourth circuit 52d is connected to the return conduit 36 of the heating circuit 30. During operation of the heat pump 50 the second heat transfer exchanger 54 is configured to heat transfer fluid entering the same via the inlet 55a of the fourth circuit 52d. The heat transfer fluid returned to the heating circuit 40 via the outlet 55b will thus be heated. In the in FIGS. 1-3 shown embodiments the outlet 55b of the fourth circuit 52d is connected to the return conduit 36 of the heating circuit 30.

In the case of the inlet 55a and the outlet 55b of the fourth circuit 52d both being connected to the return conduit 36 of the heating circuit 30, the inlet 55a of the fourth circuit 52d is preferably connected to the return conduit 36 of the heating circuit 30 upstream relative to the outlet 55b of the fourth circuit 52d.

Moreover, in the case the heat pump 50 is in operation and the inlet 55a and the outlet 55b of the fourth circuit 52d both being connected to the return conduit 36 of the heating circuit 30, the heat transfer fluid of the return conduit 36 will be heated.

Alternatively or in combination to the above configuration of the outlet 55b of the fourth circuit 52d, the outlet 55b of the fourth circuit 52d may be connected to the feed conduit 34 of the heating circuit 30. The connection of the outlet 55b of the fourth circuit 52d to the feed conduit 34 of the heating circuit 30 will be discussed in more detail below in connection with FIG. 4.

According to the above, the fourth circuit 52d and the heating circuit 30 are in fluid contact with each other.

The second circuit 52b and the third circuit 52c is a common circuit 56 of the first and second heat exchangers 51, 54. The common circuit 56 may further comprise a compressor 57. The common circuit 56 may further comprise an expansion valve 58. The heat pump 50 is configured to update the heat absorbed in the cooling circuit 40 to a useful temperature level that may be used in the heating circuit 30.

As mentioned above, in connection with FIG. 4 the connection of the outlet 53b of the first circuit 52a to the feed conduit 44 of the cooling circuit 40 and the connection of the outlet 55b of the fourth circuit 52d to the feed conduit 34 of the heating circuit 30 will be discussed.

Figure 4:
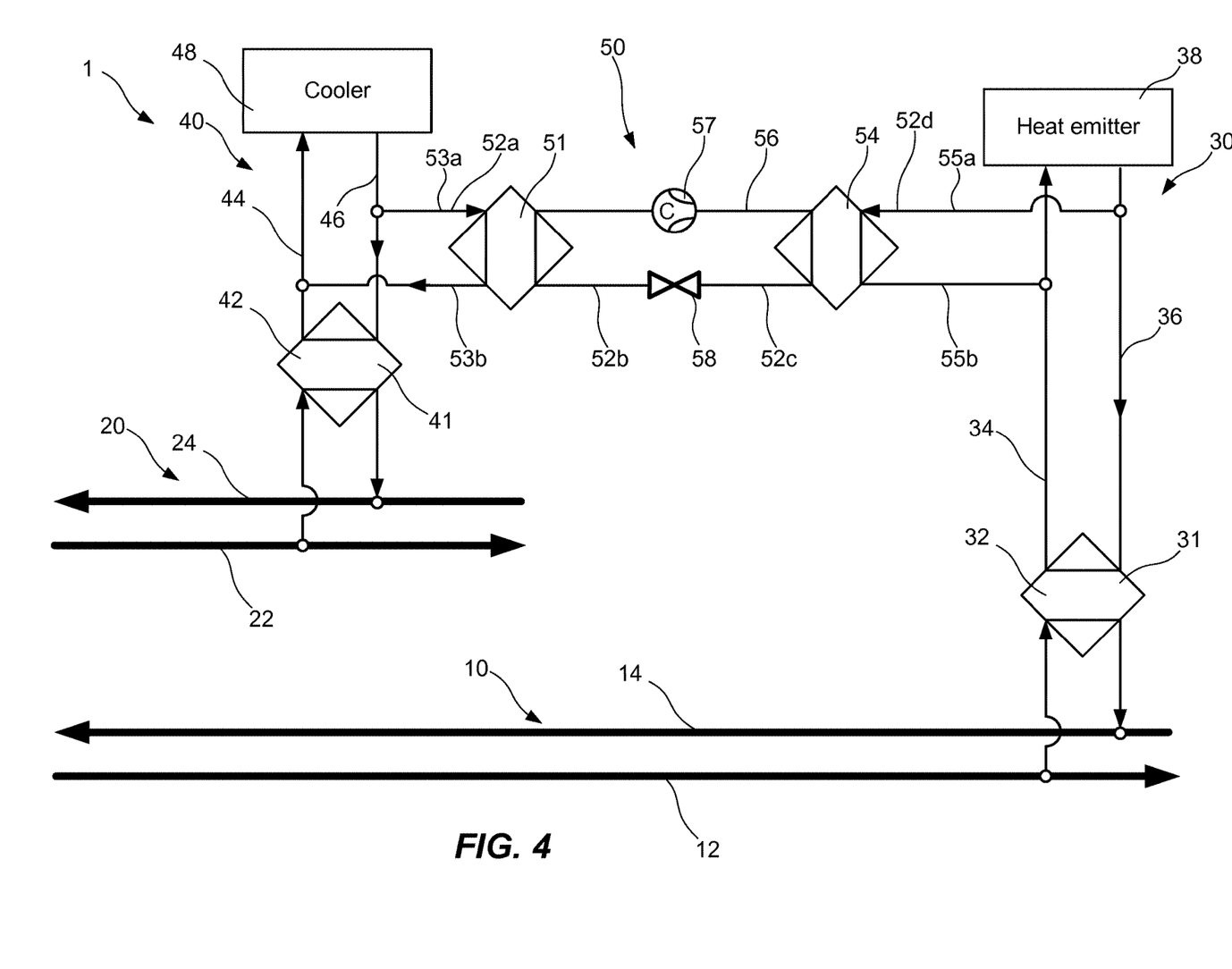
FIG. 4 is a schematic diagram of a heat transfer system according to yet an alternative embodiment.

Starting at the cooling circuit 40. In the case the heat pump 50 is in operation and the outlet 53b of the first circuit 52a is connected to the feed conduit 44 of the cooling circuit 40, the heat transfer fluid of the feed conduit 44 will be affected. In this configuration it is favorable to control the heat pump 50 such that the temperature of the heat transfer fluid returned to the feed conduit 44 of the cooling circuit 40 is controlled. Preferably, the heat pump 50 is controlled such that the temperature of the heat transfer fluid returned to the feed conduit 44 of the cooling circuit 40 has the third temperature. This since, the third temperature is the temperature the cooler 48 is requesting as input temperature. In this case also the heat extractor 42 is preferably controlled such that it delivers heat transfer fluid of the third temperature. Alternatively, the heat pump 50 and the heat extractor 42 are jointly controlled such that the heat transfer fluids ejected by them individually when mixed exhibit the third temperature.

Turning towards the heating circuit 30. In the case the heat pump 50 is in operation and the outlet 55b of the fourth circuit 52d is connected to the feed conduit 34 of the heating circuit 30, the heat transfer fluid of the feed conduit 34 will be affected. In this configuration it is favorable to control the heat pump 50 such that the temperature of the heat transfer fluid returned to the feed conduit 34 of the heating circuit 30 is controlled. Preferably, the heat pump 50 is controlled such that the temperature of the heat transfer fluid returned to the feed conduit 34 of the heating circuit 30 has the first temperature. This since, the first temperature is the temperature the heater 38 is requesting as input temperature. In this case also the heat source 32 is preferably controlled such that it delivers heat transfer fluid of the first temperature. Alternatively, the heat pump 50 and the heat source 32 are jointly controlled such that the heat transfer fluids ejected by them individually when mixed exhibit the first temperature.

The person skilled in the art realizes that the present invention by no means is limited to the preferred embodiments described above. On the contrary, many modifications and variations are possible within the scope of the appended claims.

For example, the heat transfer system 1 may comprise more than one heating circuit 30 or cooling circuit 40. In case of more than one heating circuit 30 or cooling circuit 40 the heat transfer system 1 may comprise a plurality of heat pumps 50, wherein a single heat pump 50 is connecting one cooling circuit 40 with one heating circuit 30. According to a non-limiting example the heat transfer system 1 comprises a first heating circuit 30 configured to provide comfort heating to a building, a second heating circuit 30 configured to provide hot tap water preparation to the building and a cooling circuit 40 configured to provide comfort cooling to the building. This heat transfer system 1 further comprises a first heat pump 50 connecting the cooling circuit 40 to the first heating circuit 30 and a second heat pump 50 connecting the cooling circuit 40 to the second heating circuit 30.

Moreover, above two alternatives for the heat source 32 has been discussed. However, other heat sources 32 may as well be used by its own or in combination. One example of such other heat source 32 is an electrical heater (not shown).

Furthermore, in FIGS. 1-3 and in the paragraph directly above some alternative embodiments of implementations on how thermal energy may be distributed to the heating circuit 30 and from the cooling circuit 40 are illustrated. It is realized that any combination of such distribution of thermal energy to and from the heat transfer system 1 may be used.

In the embodiments discussed in connection with FIGS. 1-3 the outlet 53b of the first circuit 52a is connected to the return conduit 46 of the cooling circuit 40 and in the embodiments discussed in connection with FIG. 4 the outlet 53b of the first circuit 52a is connected to the feed conduit 44 of the cooling circuit 40. It is however realized that the outlet 53b of the first circuit 52a may be connected both to the return conduit 46 and the feed conduit 44 of the cooling circuit 40. In this later case a valve of valves may be used to control the flow of heat transfer fluid into the return conduit conduit 46 and the feed conduit 44, respectively.

In the embodiments discussed in connection with FIGS. 1-3 the outlet 55b of the fourth circuit 52d is connected to the return conduit conduit 36 of the heating circuit 30 and in the embodiments discussed in connection with FIG. 4 the outlet 55b of the fourth circuit 52d is connected to the feed conduit 34 of the heating circuit 30. It is however realized that the outlet 55b of the first circuit 52d may be connected both to the return conduit conduit 36 and the feed conduit 34 of the heating circuit 30. In this later case a valve of valves may be used to control the flow of heat transfer fluid into the return conduit 36 and the feed conduit 34, respectively.

The connection of the outlet 53b of the first circuit 52a to the return conduit 46 of the cooling circuit 40 and/or to the feed conduit 44 of the cooling circuit 40 may of course be made independently of the connection of the outlet 55b of the fourth circuit 52d to the return conduit 36 of the heating circuit 30 and/or to the feed conduit 34 of the heating circuit 30. Hence, any permutation of the connections of the outlets 53b, 55b may be used.

Additionally, variations to the disclosed embodiments can be understood and effected by the skilled person in practicing the claimed invention, from a study of the drawings, the disclosure, and the appended claims.

The invention claimed is:

1. A heat transfer system comprising:
    a heating circuit having:
        a heat source configured to heat incoming heat transfer fluid;
        a heat emitter configured to consume heat from incoming heat transfer fluid for heating surroundings of the heat emitter;
        a feed conduit configured to, from the heat source to the heat emitter, carry heat transfer fluid having a first temperature, and
        a return conduit configured to, from the heat emitter to the heat source, carry heat transfer fluid having a second temperature, the second temperature being lower than the first temperature;
    a cooling circuit having:
        a heat extractor configured to extract heat from heat transfer fluid;
        a cooler configured to absorb heat from its surroundings in order to cool the soundings of the cooler by transferring absorbed heat to heat transfer fluid,
        a feed conduit configured to, from the heat extractor to the cooler, carry heat transfer fluid having a third temperature, and
        a return conduit configured to, from the cooler to the heat extractor, carry heat transfer fluid having a fourth temperature, the fourth temperature being higher than the third temperature; and
    a heat pump interconnecting the cooling circuit and the heating circuit and being configured to transfer excess heat energy from the cooling circuit to the heating circuit, the heat pump having:
        an evaporator heat exchanger having a first circuit for circulating heat transfer fluid and a second circuit for circulating heat transfer fluid, wherein the first circuit has an inlet and an outlet connected to the cooling circuit, wherein the inlet of the first circuit is connected to the return conduit of the cooling circuit,
        a condenser heat exchanger having a third circuit for circulating heat transfer fluid and a fourth circuit for circulating heat transfer fluid, wherein the fourth circuit has an inlet and an outlet connected to the heating circuit,
        wherein the second circuit and the third circuit form a common circuit of the evaporator and condenser heat exchangers;
        wherein the fourth temperature is lower than the second temperature.

2. The heat transfer system according to claim 1, wherein the inlet of the fourth circuit is connected to the return conduit of the heating circuit.

3. The heat transfer system according to claim 1, wherein the outlet of the first circuit is connected to the return conduit of the cooling circuit.

4. The heat transfer system according to claim 3, wherein the inlet of the first circuit is connected to the return conduit of the cooling circuit upstream relative to the outlet of the first circuit.

5. The heat transfer system according to claim 1, wherein the outlet of the fourth circuit is connected to the return conduit of the heating circuit.

6. The heat transfer system according to claim 5, wherein the inlet of the fourth circuit is connected to the return conduit of the heating circuit upstream relative to the outlet of the fourth circuit.

7. The heat transfer system according to claim 1, wherein the outlet of the first circuit is connected to the feed conduit of the cooling circuit.

8. The heat transfer system according to claim 1, wherein the outlet of the fourth circuit is connected to the feed conduit of the heating circuit.

9. The heat transfer system according to claim 1, wherein the common circuit comprises a compressor.

10. The heat transfer system according to claim 1, wherein the common circuit comprises an expansion valve.

* * * * *

UNITED STATES PATENT AND TRADEMARK OFFICE
CERTIFICATE OF CORRECTION

PATENT NO. : 11,226,108 B2
APPLICATION NO. : 16/314446
DATED : January 18, 2022
INVENTOR(S) : Per Rosén It is certified that error appears in the above-identified patent and that said Letters Patent is hereby corrected as shown below:

In the Claims

Column 9, Line 38, "soundings" should be -- surroundings --.

Signed and Sealed this
Sixth Day of February, 2024

Katherine Kelly Vidal
*Director of the United States Patent and Trademark Office*